Dec. 16, 1924.
A. J. PHELPS
1,519,876
ROUTING BIT
Filed Dec. 28, 1923
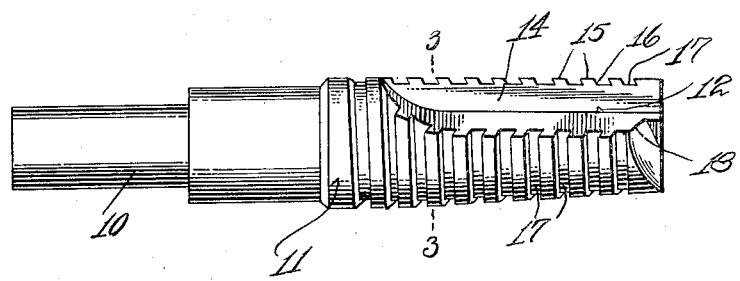
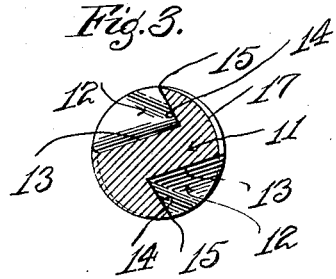 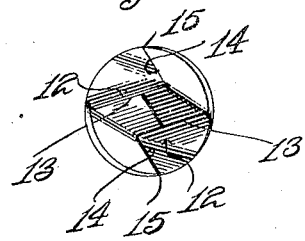
Inventor
Ab J. Phelps.

Patented Dec. 16, 1924.

1,519,876

UNITED STATES PATENT OFFICE.

AB J. PHELPS, OF ALHAMBRA, CALIFORNIA.

ROUTING BIT.

Application filed December 28, 1923. Serial No. 683,237.

*To all whom it may concern:*

Be it known that I, AB J. PHELPS, a citizen of the United States, residing at Alhambra, in the county of Los Angeles, State of California, have invented certain new and useful Improvements in Routing Bits; and I do hereby declare the following to be a full, clear, and exact description of the invention, such as will enable others skilled in the art to which it appertains to make and use the same.

This invention relates to new and useful improvements in cutting tools, and particularly to routing tools.

One object of the invention is to provide a tool of this character wherein the cutting surface is greatly reduced along each cutting edge with a corresponding increase in cutting efficiency.

Another object is to provide a routing cutter wherein the side cutting edges are made up of a series of regularly spaced cutting elements, and wherein the cutting elements of one cutting edge are so arranged that they travel into the work in paths which are between those of the other cutting edge.

Other objects and advantages will be apparent from the following description when taken in connection with the accompanying drawing.

In the drawing:

Figure 1 is a side elevation of a routing bit made in accordance with the present invention.

Figure 2 is an end view of the same.

Figure 3 is a transverse sectional view on the line 3—3 of Figure 1.

Referring particularly to the accompanying drawing, 10 represents the shank, and 11 the head of the bit. Formed longitudinally on opposite sides of the head 11 are the grooves 12, or ledges, the bottom walls 13 of which are disposed in parallel planes, and the side walls extending at an acute angle to the bottom walls. The outer portions of the side walls 14 meet the peripheral face of the head to form a cutting edge. Each of the cutting edges is divided into a series of regularly spaced cutting elements 15. These cutting elements are the ends of the circumferentially and slightly spirally extending ribs 16, formed on the outer face of the head 11, and between which are the resulting grooves 17.

It will be noted, however, that the cutting ends of one set of ribs, or those ribs which extend between the grooves or ledges 12, are disposed opposite the corresponding ends of the other set of ribs, with the result that as the tool rotates the two series of cutting elements 15 act upon the work in the same manner as a single cutting edge which would extend the entire length of the tool. The provision of the series of cutting elements, or subdividing the cutting edge into a series of smaller parts, reduces the cutting surface on each cutting edge by practically one-half, but with the corresponding increase in efficiency.

While I have illustrated the head of the tool provided with two longitudinal grooves or ledges, it will be readily understood that this number may be increased, with the corresponding and proportionate increase in the number of the cutting elements 15.

The spiral arrangement of the ribs and intermediate grooves serves to facilitate the outlet of the shavings and chips removed from the wood by the cutting elements. It will be further noted that the bodies of the ribs 16 incline to a certain degree toward the shank of the bit.

What is claimed is:

A routing bit including a shank having a head, said head having diametrically opposite and longitudinally extending ledges, one wall of each of which lies in a plane parallel with the corresponding wall of the other ledge and transversely of the head, the other wall of each ledge meeting the first wall at an acute angle, the outer faces of the portions of the head between said shoulders or ledges being formed with spirally extending ribs and grooves, said ribs and grooves being deepest at the point of intersection of the second walls with the peripheral face of the head and shallowest at the point of intersection of the first walls with said peripheral face, the deepest ends of the ribs and grooves being disposed in staggered relation to the shallowest ends of the other ribs and grooves.

In testimony whereof, I affix my signature, in the presence of two witnesses.

AB J. PHELPS.

Witnesses:
MARY PYLE,
O. L. ANSPACH.